(12) United States Patent
Leftik et al.

(10) Patent No.: US 8,914,521 B2
(45) Date of Patent: Dec. 16, 2014

(54) SYSTEM AND METHOD FOR PROVIDING ACTIVE-PASSIVE ROUTING IN A TRAFFIC DIRECTOR ENVIRONMENT

(75) Inventors: Adam Leftik, Alamo, CA (US); Hideaki Hayashi, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/601,087

(22) Filed: Aug. 31, 2012

(65) Prior Publication Data

US 2013/0080510 A1 Mar. 28, 2013

Related U.S. Application Data

(60) Provisional application No. 61/539,886, filed on Sep. 27, 2011, provisional application No. 61/539,900, filed on Sep. 27, 2011.

(51) Int. Cl.
*G06F 15/16* (2006.01)
*G06F 9/50* (2006.01)
*G06F 9/44* (2006.01)
*G06F 9/455* (2006.01)
*G06F 11/20* (2006.01)
*H04L 29/08* (2006.01)

(52) U.S. Cl.
CPC ............. *G06F 9/505* (2013.01); *G06F 9/4443* (2013.01); *G06F 9/45512* (2013.01); *G06F 11/2041* (2013.01); *H04L 67/1008* (2013.01)
USPC .......................................... 709/227; 709/203

(58) Field of Classification Search
None
See application file for complete search history.

(56) References Cited

U.S. PATENT DOCUMENTS

| 6,691,244 | B1 | 2/2004 | Kampe et al. |
| 7,158,926 | B2 | 1/2007 | Kampe |
| 7,289,445 | B2 | 10/2007 | Illikkal et al. |
| 7,321,926 | B1 | 1/2008 | Zhang et al. |

(Continued)

FOREIGN PATENT DOCUMENTS

| GB | 2 360 369 A | 9/2001 |
| WO | 02/07037 | 1/2002 |
| WO | 03/105004 | 12/2003 |
| WO | 2004/008334 | 1/2004 |

OTHER PUBLICATIONS

Method and System for Displaying Graphical Objects in a Command Line Interface (CLI) Terminal, ip.com Journal, ip.com Inc., West Henrietta, NY, US, Feb. 18, 2010.

(Continued)

*Primary Examiner* — Moustafa M Meky
*Assistant Examiner* — Clayton R Williams
(74) *Attorney, Agent, or Firm* — Meyer IP Law Group (57) ABSTRACT

Described herein are systems and methods for use with a load balancer or traffic director, and administration thereof. In accordance with an embodiment, the system comprises a traffic director having one or more traffic director instances, which is configured to receive and communicate requests from clients to origin servers. A pool of origin servers is configured so that at least one or more of the servers within the pool are assigned as primary servers, and at least one or more others of the servers within the pool are assigned as backup servers. The traffic director is configured so that it determines the availability of primary servers in the pool, and directs requests only to the primary servers while the pool includes a sufficient number of available primary servers.

15 Claims, 7 Drawing Sheets

(56) References Cited

U.S. PATENT DOCUMENTS

| | | | |
|---|---|---|---|
| 7,370,083 B2 | 5/2008 | Husain et al. | |
| 7,395,355 B2 | 7/2008 | Afergan et al. | |
| 7,616,625 B1 | 11/2009 | Un et al. | |
| 7,619,545 B2 | 11/2009 | Samuels et al. | |
| 7,664,948 B2 | 2/2010 | Moreau | |
| 7,849,368 B2 | 12/2010 | Srivastava et al. | |
| 2001/0049732 A1 | 12/2001 | Raciborski et al. | |
| 2002/0087694 A1* | 7/2002 | Daoud et al. | 709/226 |
| 2002/0122388 A1 | 9/2002 | Behbehani | |
| 2002/0152307 A1 | 10/2002 | Doyle et al. | |
| 2003/0051055 A1 | 3/2003 | Parrella et al. | |
| 2003/0195940 A1 | 10/2003 | Basu et al. | |
| 2004/0031030 A1 | 2/2004 | Kidder et al. | |
| 2004/0049598 A1 | 3/2004 | Tucker et al. | |
| 2004/0107273 A1* | 6/2004 | Biran et al. | 709/223 |
| 2004/0172470 A1 | 9/2004 | Shiina | |
| 2005/0086337 A1 | 4/2005 | Quittek et al. | |
| 2005/0188295 A1 | 8/2005 | Konkus et al. | |
| 2005/0198247 A1 | 9/2005 | Perry et al. | |
| 2005/0262183 A1 | 11/2005 | Colrain et al. | |
| 2006/0062177 A1 | 3/2006 | Asthana et al. | |
| 2006/0085680 A1 | 4/2006 | Matsuno et al. | |
| 2006/0190579 A1 | 8/2006 | Rachniowski et al. | |
| 2007/0005801 A1 | 1/2007 | Kumar et al. | |
| 2007/0169049 A1 | 7/2007 | Gingell et al. | |
| 2007/0174660 A1 | 7/2007 | Peddada | |
| 2007/0226359 A1 | 9/2007 | Gunduc et al. | |
| 2008/0046596 A1 | 2/2008 | Afergan et al. | |
| 2008/0133536 A1 | 6/2008 | Bjorner et al. | |
| 2008/0228939 A1 | 9/2008 | Samuels et al. | |
| 2009/0204885 A1 | 8/2009 | Ellsworth et al. | |
| 2009/0245122 A1 | 10/2009 | Maiocco et al. | |
| 2009/0328054 A1 | 12/2009 | Paramasivam et al. | |
| 2010/0070561 A1 | 3/2010 | Dhoolia et al. | |
| 2010/0220740 A1 | 9/2010 | Hufferd | |
| 2010/0235484 A1 | 9/2010 | Bolan et al. | |
| 2011/0107136 A1 | 5/2011 | Jonnagadla et al. | |
| 2011/0122893 A1 | 5/2011 | Kang et al. | |
| 2011/0145786 A1 | 6/2011 | Fayed et al. | |
| 2011/0161523 A1 | 6/2011 | Erickson et al. | |
| 2011/0208808 A1 | 8/2011 | Corbett | |
| 2013/0054806 A1* | 2/2013 | Francis et al. | 709/226 |

OTHER PUBLICATIONS

Elkstein, Dr. M., 14.3 How Do I Handle Authentication in REST?, Aug. 26, 2011, http://web.archive.org/web/20110826023142/http://rest.elkstein.org/2008/01/how-do-i-handle-authentication-in-rest.html, retrieved Apr. 24, 2013.

International Searching Authority, International Search Report and Written Opinion for PCT International Patent Application No. PCT/US2012/057370, May 31, 2013, 17 pages.

International Searching Authority, International Search Report and Written Opinion for PCT International Patent Application No. PCT/US2012/057373, Feb. 14, 2013, 13 pages.

International Searching Authority, International Search Report and Written Opinion for PCT International Application No. PCT/US2012/057375, May 24, 2013, 19 pages.

International Searching Authority, International Search Report and Written Opinion for PCT International Application No. PCT/US2012/057620, Jun. 5, 2013, 22 pages.

Wikipedia, HTTP Compression, pp. 1-2, http://en.wikipedia.org/w/index.php?title=HTTP_compression&oldid=450858133, Sep. 16, 2011.

* cited by examiner

SYSTEM AND METHOD FOR PROVIDING ACTIVE-PASSIVE ROUTING IN A TRAFFIC DIRECTOR ENVIRONMENT

CLAIM OF PRIORITY

This application claims the benefit of priority to U.S. Provisional Patent Application No. 61/539,886, titled "SYSTEMS AND METHODS FOR USE WITH AN APPLICATION SERVER TRAFFIC DIRECTOR (CORE FEATURES)", filed Sep. 27, 2011; and U.S. Provisional Patent Application No. 61/539,900, titled "SYSTEMS AND METHODS FOR USE WITH AN APPLICATION SERVER TRAFFIC DIRECTOR (ADMIN FEATURES)", filed Sep. 27, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to a load balancer or traffic director, for use in an application server, middleware machine or other computing environment, and is particularly related to a system and method for providing active-passive routing in a traffic director environment.

BACKGROUND

A typical enterprise-level computing environment can include many different types of computing resources (e.g., web servers, application servers, database servers, or other types of resource servers) which are intended to be accessed over a network (e.g., a company's internal Ethernet network, or the Internet) by other computers, or by users operating various different types of computing devices. A familiar example is the use of a client computer, such as a laptop equipped with a web browser application, by which a user can access a web server via the Internet.

Today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies. These are the types of environments that embodiments of the invention can be used with.

SUMMARY

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the system comprises a traffic director having one or more traffic director instances, which is configured to receive and communicate requests from clients to origin servers. A pool of origin servers is configured so that at least one or more of the servers within the pool are assigned as primary servers, and at least one or more others of the servers within the pool are assigned as backup servers. The traffic director is configured so that it determines the availability of primary servers in the pool, and directs requests only to the primary servers while the pool includes a sufficient number of available primary servers.

DETAILED DESCRIPTION

As described above, today's organizations rely increasingly on their computing resources being readily available from almost any location, at all times, with a high level of performance. The task of ensuring that such resources are allocated efficiently often requires the use of a load balancing device to distribute requests from clients to target resources, in a fair manner according to its distribution policies.

Described herein are systems and methods for use with a load balancer or traffic director, and administration thereof. In accordance with an embodiment, the traffic director, referred to herein in some embodiments as "Oracle Traffic Director" (OTD), is provided as a software-based load balancer that can be used to deliver a fast, reliable, scalable, and secure platform for load-balancing Internet and other traffic to back-end origin servers, such as web servers, application servers, or other resource servers.

Embodiments of the traffic director are particularly useful in application server, middleware machine, and similar high-performance enterprise-level computing environments, such as Oracle WebLogic and Exalogic environments.

In accordance with an embodiment, the traffic director serves as an entry point for traffic such as hypertext transfer protocol (HTTP) and hypertext transfer protocol secure (HTTPS) requests, which are received from clients or client devices, for communication to a back-end of resources or resource servers acting as origin servers. Each traffic director includes one or more traffic director instances defined by a configuration, wherein the configuration provides information about various elements of that instance, such as listeners, origin servers, failover groups, and logs.

Examples of the types of clients that can be used with the system include computer servers, laptop computers, portable devices such as smartphones, and other types of computing devices, some of which may include, e.g., a web browser application for accessing a web server.

Examples of the types of resources that can be used as origin servers include lightweight directory access protocol (LDAP) servers, web servers, multimedia servers, application servers, database servers, and other types of resources.

In accordance with an embodiment, the traffic director can perform tasks such as distributing requests to origin servers based on one or more load-balancing methods; routing requests based on specified rules; caching frequently accessed data; prioritize traffic; and controlling the quality of service.

From a performance perspective, in accordance with an embodiment, the traffic director can include an architecture that enables it to handle large volumes of traffic with low latency. For example, embodiments can be optimized for use within a high-performance computing environment such as, e.g., Oracle Exalogic Elastic Cloud, or to communicate with origin servers at the back-end using a high performance communication fabric such as, e.g., InfiniBand. In accordance with an embodiment, to support high availability, the traffic director can recognize failover groups of traffic director instances that provide active-passive or active-active failover. As the volume of traffic to a network increases, the traffic director environment can be scaled by reconfiguring the traffic director with additional back-end servers to which it can route requests, or by modifying the rate at which traffic is communicated.

From an administration perspective, in accordance with an embodiment, the traffic director is designed to be easy to install, configure, and use; and can include a simple, wizard-driven graphical interface, as well as a robust command-line interface, for use by an administrator in managing traffic director instances. For any particular organization, depending on their business requirements, such as the number of back-end applications for which they want to use the traffic director to balance requests, their internal requirements such as security, and the traffic director features they wish to use, the traffic director topology can be varied to address their needs. For example, a simple traffic director topology might initially utilize a single traffic director instance running on a dedicated compute node and distributing client requests to a pool of servers at the back-end. To avoid a single point of failure, an administrator can configure two homogenous traffic director instances running on different nodes and forming an active-passive failover pair. To improve resource utilization, an administrator can configure the two traffic director instances in active-active mode with two virtual IP addresses.

GLOSSARY

In accordance with an embodiment, the following terms are used herein. It will be evident that, in accordance with other embodiments, additional and/or different terms can be used.

Configuration: A collection of configurable elements (e.g., metadata) that determines the run-time behavior of a traffic director instance. In accordance with an embodiment, a typical configuration contains definitions for listeners (e.g., IP address and port combinations) on which the traffic director should listen for requests, together with information about servers at the back-end to which the requests should be sent. The traffic director can read the configuration when a traffic director instance starts, and while processing client requests.

Instance (Traffic Director Instance): A traffic director server that is instantiated from a configuration and deployed on an administration node or the administration server.

Cluster: A collection of two or more traffic director instances that are created from the same configuration.

Failover Group: Two or more traffic director instances grouped by a virtual IP address (VIP). In accordance with an embodiment, a failover group provides high availability in active-passive mode; wherein requests are received at the VIP and routed to the instance that is designated as the primary instance; if the primary instance is not reachable, requests are routed to the backup instance. In accordance with an embodiment, for active-active failover, two failover groups are required, each with a unique VIP, but both comprising the same nodes with the primary and backup roles reversed; each instance in the failover group is designated as the primary instance for one VIP, and the backup for the other VIP.

Administration Server: A specially configured traffic director instance that hosts the interfaces, including administration console and command-line interface, through which an administrator can create traffic director configurations, deploy them as instances on administration nodes, and manage the instances.

Administration Node: A physical server that is designated as a host on which the administrator can deploy traffic director instances. In accordance with an embodiment, on a given node, the administrator can deploy only one instance of a configuration.

INSTANCE_HOME: A directory of the administrator's choice, on the administration server or an administration node, in which the configuration data and binary files pertaining to traffic director instances are stored.

ORACLE_HOME: A directory of the administrator's choice in which the administrator installs the traffic director binaries.

Administration Console: A web-based graphical interface on the administration server that the administrator can use to create, deploy, and manage traffic director instances.

Client: In accordance with an embodiment, an agent (e.g., a web browser or an application) that sends requests (e.g., HTTP and HTTPS requests) to traffic director instances. Examples of the types of clients that can be used with the system include computer servers, laptop computers, portable devices such as smartphones, and other types of computing devices, some of which may include, e.g., a web browser application for accessing a web server.

Origin Server: In accordance with an embodiment, a resource or server at the back-end, to which the traffic director forwards the requests that it receives from clients, and from which it receives responses to client requests. Examples of the types of resources that can be used as origin servers include lightweight directory access protocol (LDAP) servers, web servers, multimedia servers, application servers, database servers, and other types of resources.

Origin-server Pool: A collection of origin servers that host the same application or service, and that the administrator can load-balance by using the traffic director. In accordance with an embodiment, the traffic director distributes client requests to servers in the origin-server pool based on the load-distribution method(s) that are specified for that pool.

Virtual Server: A virtual entity within a traffic director server instance that provides a unique IP address (or host name) and port combination, through which the traffic director can serve requests for one or more domains. In accordance with an embodiment, a traffic director instance on a node can contain multiple virtual servers. The administrator can configure settings such as the maximum number of incoming connections specifically for each virtual server, and can also customize how each virtual server handles requests.

Figure 1:
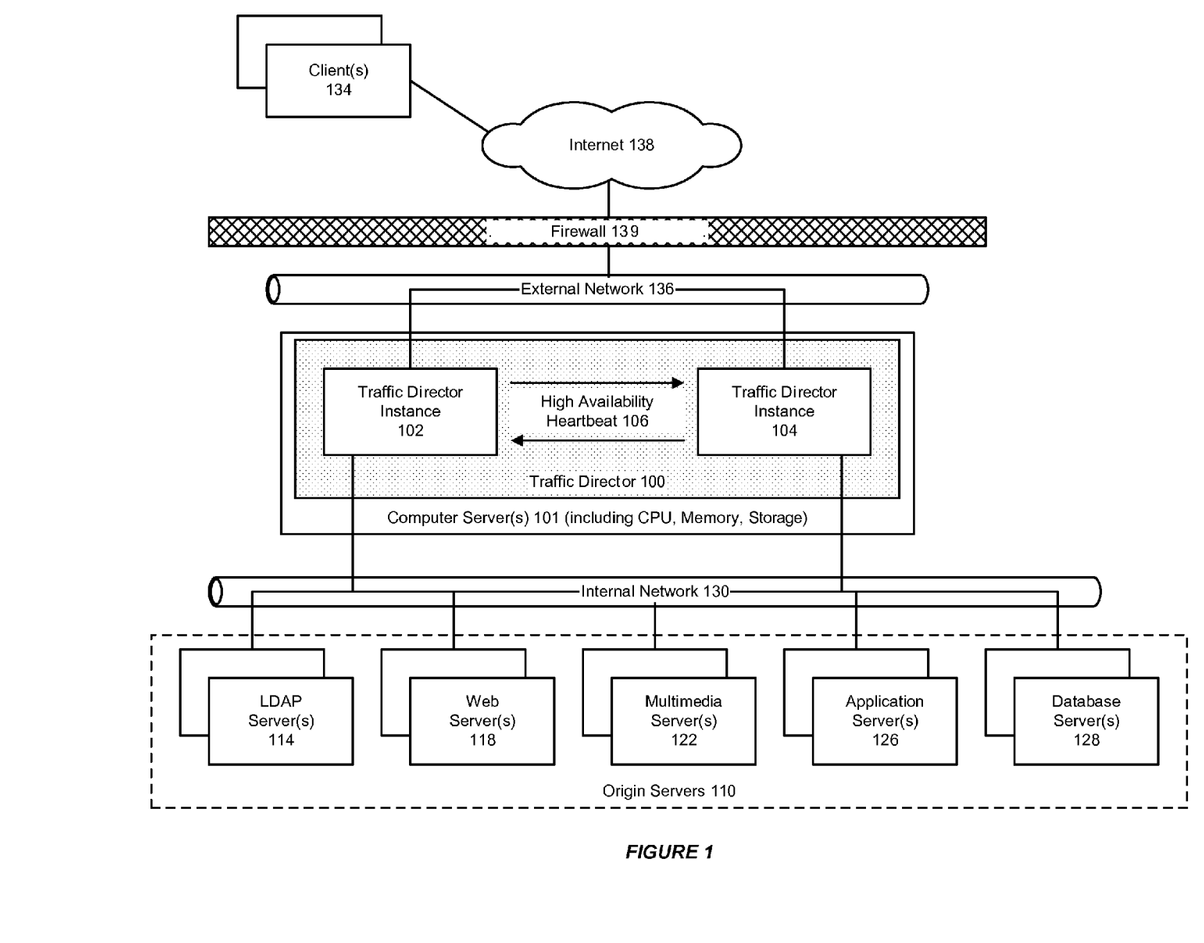
FIG. 1 illustrates a computing environment which includes a load balancer or traffic director, in accordance with an embodiment.

FIG. 1 illustrates a computing environment which includes a load balancer or traffic director, in accordance with an embodiment. As shown in FIG. 1, in accordance with an embodiment, the traffic director 100 (referred to herein in some embodiments as Oracle Traffic Director (OTD)) can be deployed on one or more physical computer servers 101 (or similar computing devices that include a processor (CPU), memory, and storage), and can include one or more traffic director instances 102, 104, which in turn can communicate with one another using a high-availability heartbeat or similar means 106.

For any particular organization, depending on their business requirements, such as the number of back-end applications for which they want to use the traffic director to balance requests, their internal requirements such as security, and the traffic director features they wish to use, the traffic director topology can be varied to address their needs. The back-end can include one or more origin servers 110, examples of which can include LDAP servers 114, web servers 118, multimedia servers 122, application servers 126, and database servers 128. In accordance with an embodiment, the application server can be a WebLogic server (WLS). Other types of origin servers, and application servers, can be used, depending on the particular needs of the organization. Each of the origin servers can communicate with one another, and with the traffic director, via an internal network 130 such as an Ethernet network.

In accordance with an embodiment, the traffic director can receive requests from clients 134, via an external network 136, the Internet 138, and in the case of many organizations a firewall 139. Examples of the types of clients that can be used with the system include computer servers, laptop computers, portable devices such as smartphones, and other types of computing devices, some of which may include, e.g., a web browser application for accessing a web server.

Figure 2:
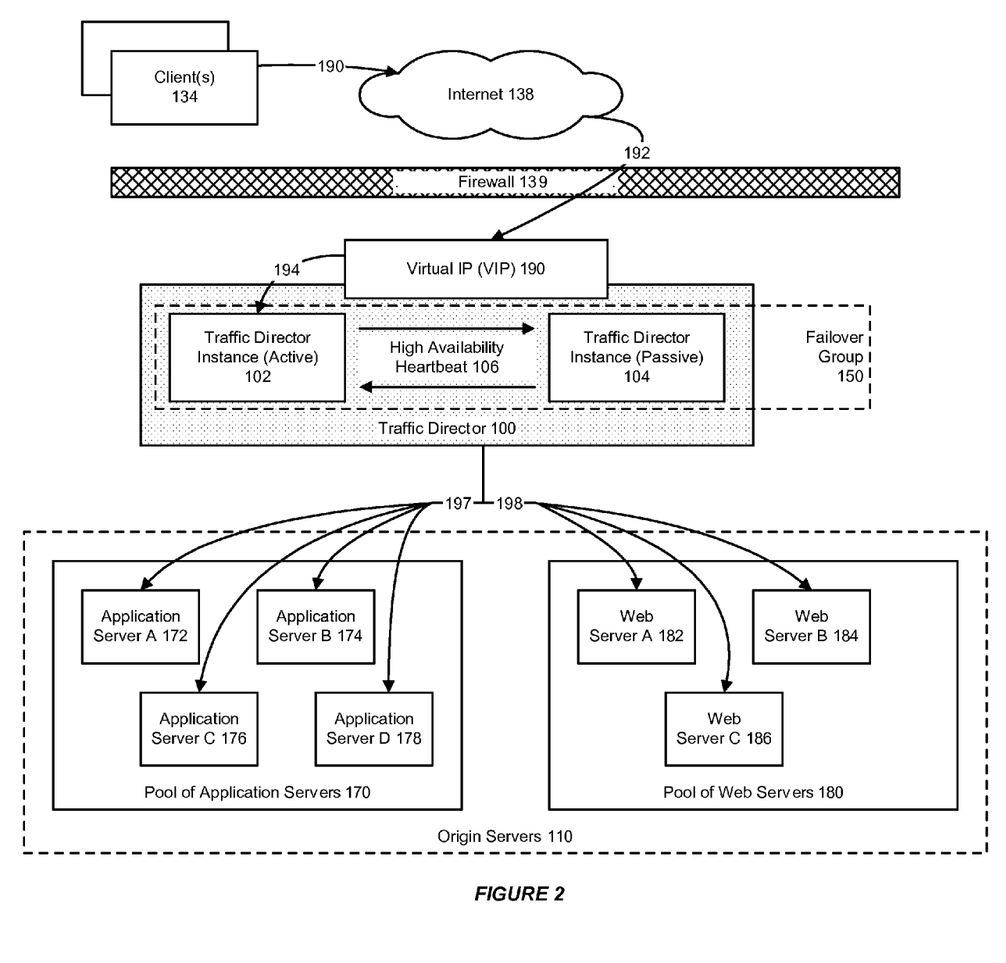
FIG. 2 illustrates the use of a traffic director with one or more pools or origin servers, in accordance with an embodiment.

FIG. 2 illustrates the use of a traffic director with one or more pools or origin servers, in accordance with an embodiment. In the example illustrated in FIG. 2, the traffic director is used with two pools, including a (first) pool of application servers 170, having four application servers, here indicated as A 172, B 174, C 176, D 178; and a (second) pool of web servers 180, having three web servers, here indicated as A 182, B 184, C1 86. In accordance with other embodiments and examples, other types and numbers of pools and servers can be used, depending on the particular needs of the organization.

In the example illustrated in FIG. 2, the topology comprises two traffic director instances (102 and 104) forming an active-passive failover group 150, and including a single virtual IP address 190 for receipt of client requests. When the active instance (in this example instance 102) receives a request 190, 192, 194, it determines the server pool to which the request should be sent, and forwards the request 197, 198 to one of the servers in that pool, based on the load-distribution method(s) that are specified for that pool.

Although the example shown in FIG. 2 illustrates the use of two server pools at the back-end, an administrator can configure the traffic director to route requests to servers in multiple pools. In the active-passive setup illustrated in FIG. 2, one node in the failover group is redundant at any point in time. In accordance with an embodiment, to improve resource utilization, the administrator can configure the two traffic director instances in active-active mode with two virtual IP addresses; in this scenario each instance caters to requests received on one virtual IP address, and backs up the other instance.

Figure 3:
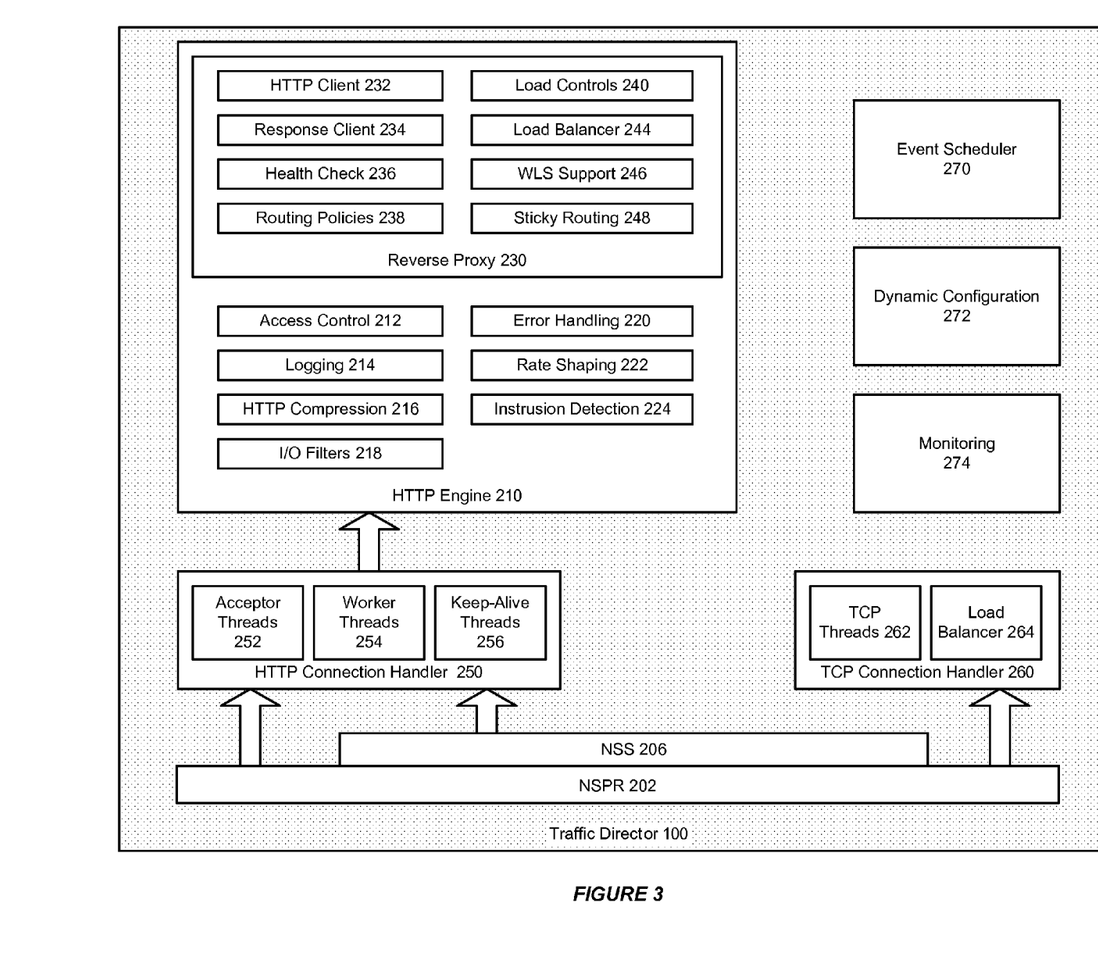
FIG. 3 illustrates a traffic director architecture, in accordance with an embodiment.

FIG. 3 illustrates a traffic director architecture, in accordance with an embodiment. In accordance with an embodiment, the traffic director can include an architecture that enables it to handle large volumes of traffic with low latency. Embodiments can also be optimized for use within a high-performance computing environment, or to communicate with origin servers at the back-end using a high performance communication fabric.

As shown in FIG. 3, in accordance with an embodiment, the traffic director can include one or more Netscape portable runtime (NSPR) 202 and Network Security Services (NSS) 206 layers. In accordance with an embodiment, the traffic director can also include an HTTP engine 210 having one or more access control 212, logging 214, HTTP compression 216, I/O filter 218, error handling 220, rate shaping 222, intrusion detection 224, or other components; and a reverse proxy component 230 having one or more http client 232, response client 234, health check 236, routing policies 238, load controls 240, load balancer 244, WLS support 246, sticky routing 248, or other components. In accordance with an embodiment, the traffic director can also include an HTTP connection handler 250 having one or more acceptor threads 252, worker threads 254, keep-alive threads 256, or other components. In accordance with an embodiment, the traffic director can also include a TCP connection handler 260 having one or more TCP threads 262, load balancer 264, or other components. In accordance with an embodiment, the traffic director can also include one or more evens schedule 270, dynamic configuration 272, monitoring 274, or other components.

It will be evident that, in accordance with other embodiments, additional and/or different components can be used.

Figure 4:
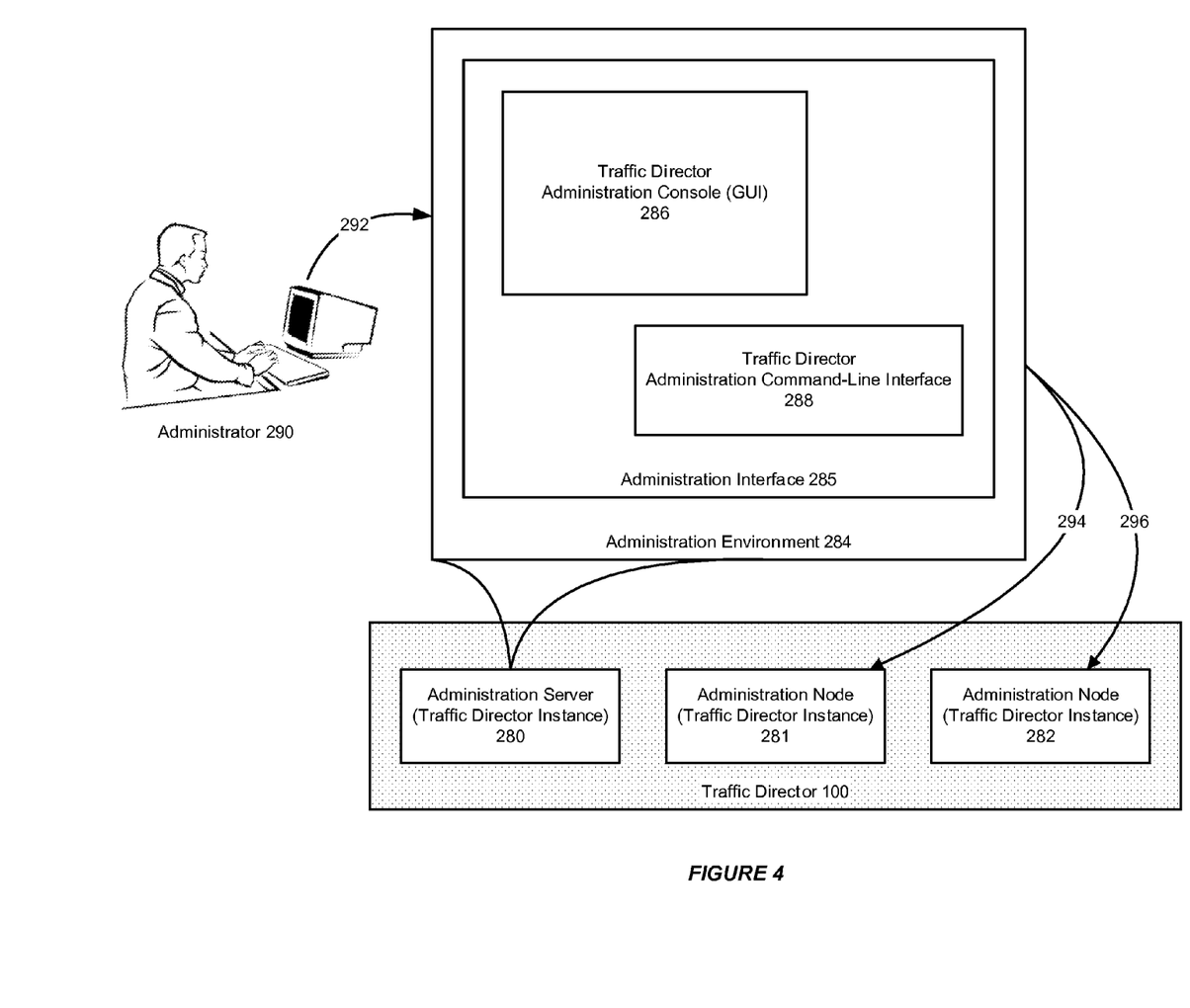
FIG. 4 illustrates a traffic director administration environment and interface, in accordance with an embodiment.

FIG. 4 illustrates a traffic director administration environment and interface, in accordance with an embodiment. From an administration perspective, the traffic director is designed to be easy to install, configure, and use; and can include a simple, wizard-driven graphical interface, as well as a robust command-line interface, for use by an administrator in managing traffic director instances. As shown in FIG. 4, in accordance with an embodiment, the traffic director can include one or more traffic director instances 280, 281, 282, wherein at least one of the instances is designated an administration server (280), while other instances are designated as administration nodes (281, 282).

In accordance with an embodiment, an administration environment 284 includes an administration interface 285, which in turn includes one or more of an administration console (GUI) 286 and/or a command line interface 288, that enables an administrator 290 to configure or otherwise administer 292 the traffic director, or its instances 294, 296.

Active-Passive Routing

In some active/passive routing methodologies, a load balancer maintains a first cluster of servers as a primary (i.e. an active) cluster, and another cluster of servers as a backup (i.e. a passive) cluster. This is useful in disaster recovery situations whereby, when the primary data center is down, the traffic is routed to the backup data center automatically. In accordance with an embodiment, the traffic director takes a nuanced approach, whereby the traffic director picks up backup nodes only after all of the active nodes are down.

In accordance with an embodiment, within a server pool, some of the origin servers can be specified as primary servers, while others are specified as backup servers. The traffic director will only route requests to non-backup servers (i.e., to primary servers) if at least one primary server is available. However, if no primary server is available, then the traffic director will route the requests to the backup servers in the pool. Once any primary server becomes available again, the traffic director will stop sending requests to the backup servers, and will route subsequent requests to the primary server(s).

Figure 5:
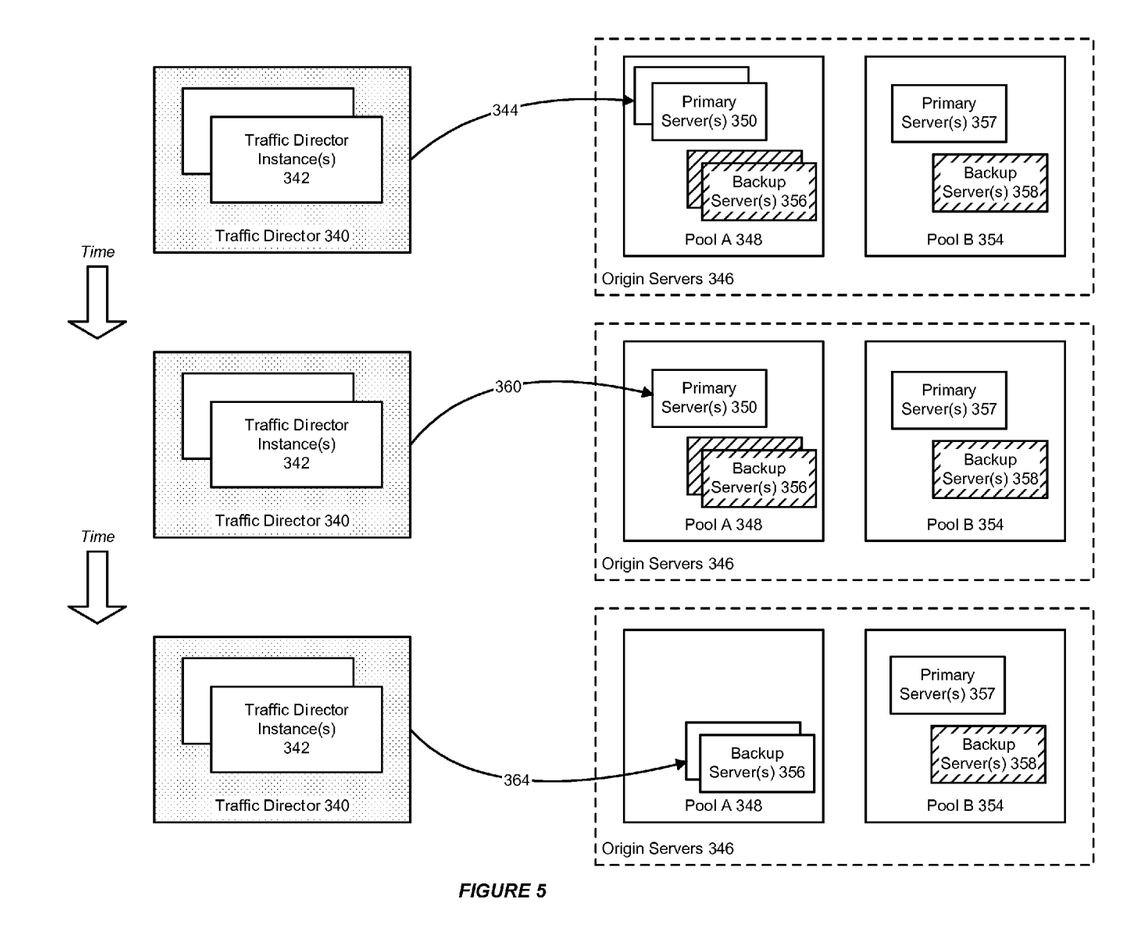
FIG. 5 illustrates the use of active/passive routing in a traffic director, in accordance with an embodiment.

FIG. 5 illustrates the use of active/passive routing in a traffic director, in accordance with an embodiment. As shown in FIG. 5, an active/passive environment can include a traffic director 340, having one or more traffic director instances 342, for use in routing requests to origin servers 346. The origin servers can be configured as one or more pools of servers (here shown as Pool A 348, and Pool B 354), each pool having one or more primary servers 350, 357, and one or more backup servers 356, 358.

As illustrated in FIG. 5, the traffic director can be configured so that, for any particular pool (e.g., Pool A), originally the traffic director will only route requests 344 to the non-backup servers (i.e., primary servers) if at least one primary server is available in that pool, and will not route requests to the backup servers (which are shaded here for illustration).

In accordance with an embodiment, after a period of time, although one or more primary servers may become unavailable, perhaps due to failure, the traffic director will continue to only route requests 360 to the primary server(s) in that pool, if at least one primary server is available.

After another period of time, in accordance with an embodiment, if all of the primary servers in the pool become unavailable, then the traffic director will instead route requests 364 to the backup servers in the pool.

Figure 6:
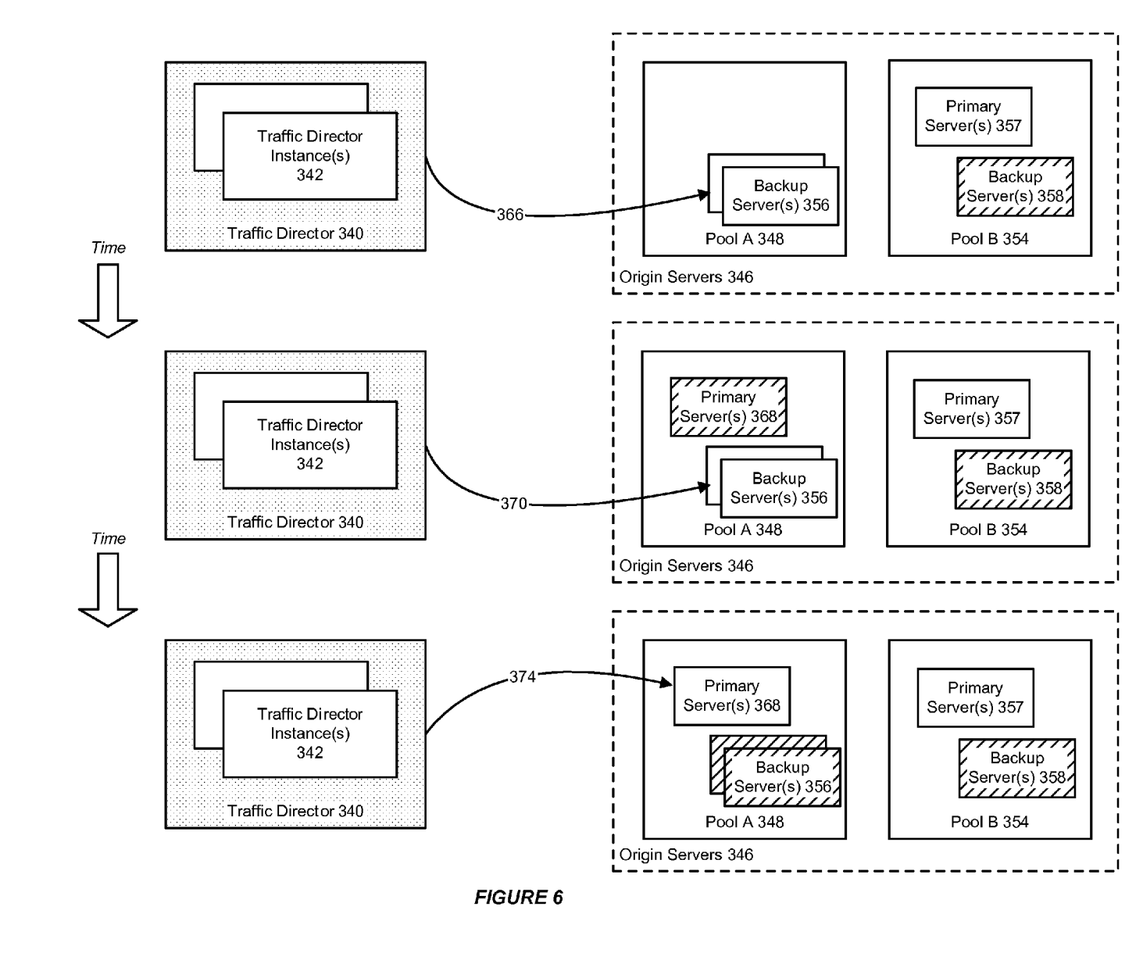
FIG. 6 further illustrates the use of active/passive routing in a traffic director, in accordance with an embodiment.

FIG. 6 further illustrates the use of active/passive routing in a traffic director, in accordance with an embodiment. As shown in FIG. 6, if all of the primary servers in the pool are still unavailable, then the traffic director will continue to route requests 366 to the backup servers in the pool.

When a primary server is made available again 368, depending on the configuration, the traffic server may delay for a period of time before beginning to forward traffic to the (new or otherwise now available) primary server. In this case, the traffic director will continue 370 to route requests to the backup servers for a period of time, and will not yet route requests to the primary servers (which are shaded here for illustration).

Subsequently, once at least one primary server is fully available again, the traffic director will again only route requests 374 to non-backup servers (i.e., primary servers) if at least one primary server is available, and will not route requests to backup servers.

In accordance with an embodiment, in the case that sticky routing is configured, if a primary server becomes unavailable, then all subsequent requests sticky to the server will not be rejected, but will be routed to other primary servers or backup servers if no primary server is available. Since transition origin servers may not have session information stored for sticky requests, the sessions will probably fail in this case. However, a new serving server may challenge the sender and establish new sessions for those sticky requests. The backup server will be used for routing only when all the primary servers are not available.

In accordance with an embodiment, to configure active/passive routing for use with the traffic director, an element called "backup-server" can be added in the element <origin-server> in a server.xml file for specifying backup servers, parameters and examples of which are provided in Table 1, and Listing 1 respectively.

TABLE 1

| Element | Occurrences | Description | Value |
|---|---|---|---|
| backup-server | 0 or 1 | The parameter specifies if the origin server is a backup server | True or False. By default, False. |

Listing 1

```
<server>
......
<reverse-proxy>
<server-pool>
<name>mypool2</name>
<load-distribution>weighted-round-robin</load-distribution>
    <origin-server>
        <host>server1</host>
        <port>80</port>
        <protocol>HTTP</protocol>
        <weight>10</weight>
        <backup-server>true</backup-server>
        <max-connections>50</max-connections>
        <ramp-up-time>600</ramp-up-time>
    </origin-server>
    <origin-server>
        <host>server2</host>
        <port>80</port>
        <protocol>HTTP</protocol>
        <weight>20</weight>
        <backup-server>false</backup-server>
        <max-connections>100</max-connections>
        <ramp-up-time>300</ramp-up-time>
    </origin-server>
</server-pool>
......
</reverse-proxy>
......
</server>
```

Figure 7:
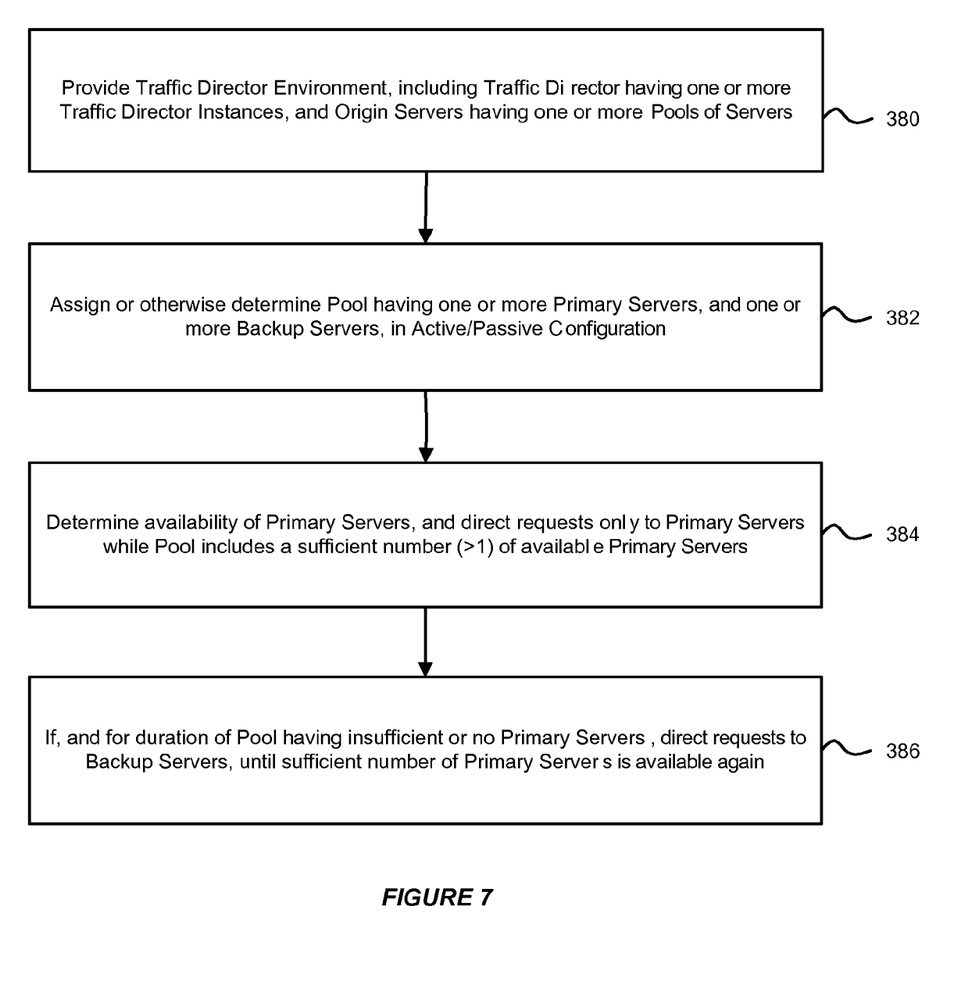
FIG. 7 is a flowchart of a method for providing active/passive routing in a traffic director, in accordance with an embodiment.

FIG. 7 is a flowchart of a method for providing active/passive routing in a traffic director, in accordance with an embodiment. As shown in FIG. 7, at step 380, a traffic director environment is provided, including a traffic director having one or more traffic director instances, and origin servers having one or more pools of servers. At step 382, one or more primary servers and one or more backup servers are assigned to a pool, in an active/passive configuration. At step 384, the traffic director determines the availability of primary servers in the pool, and directs requests only to the primary servers while the pool includes a sufficient number of available primary servers. In accordance with an embodiment, the traffic director will only route requests to non-backup servers (i.e., primary servers) if at least one primary server is available. At step 386, if there is an insufficient number of primary servers in the pool (which in accordance with an embodiment is less than one, i.e., no primary servers), then the traffic director will direct requests to backup servers in the pool, until the number of primary servers becomes available again. At that point, depending on the configuration the traffic director can again directs requests only to the primary servers while the pool includes a sufficient number of servers.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe features in the context of an Oracle Traffic Director environment, the described features can also be used in the context of other computing environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use in a computing environment which includes a traffic director component, comprising:
   a microprocessor and a computer memory;
   a traffic director having one or more traffic director instances operating on said microprocessor and computer memory, wherein the traffic director is configured to receive and communicate requests, from clients, to origin servers;
   a first pool of origin servers comprising one or more as primary servers, and or more backup servers;
   wherein the traffic director is configured so that it determines the availability of said one or more primary servers in the first pool, and directs all requests received by the traffic director for the first pool only to said one or more primary servers in the first pool while at least one of said primary servers in the first pool is available; and
   wherein the traffic director is configured so that, if no primary server is available in the first pool then the traffic director will direct all requests received by the traffic director for the first pool to said one or more backup servers in the first pool until at least one of said primary servers in the first pool becomes available again.

2. The system of claim 1, wherein the traffic director is configured so that, if at least one of said primary servers becomes available again after no primary server was available, the traffic director will continue to direct all requests received by the traffic director to said one or more backup servers in the pool for a configurable period of time after at least one of said primary servers becomes available again.

3. The system of claim 1, comprising:
   a second pool of origin servers comprising one or more primary servers, and one or more backup servers;
   wherein the traffic director is configured so that it determines the availability of said one or more primary servers in the second pool, and directs all requests received by the traffic director for the second pool only to said one or more primary servers in the second pool while at least one of said primary servers in the second pool is available; and
   wherein the traffic director is configured so that, if no primary server is available in the second pool then the traffic director will direct all requests received by the traffic director for the second pool to said one or more backup servers in the second pool until at least one of said primary servers in the first pool becomes available again.

4. The system of claim 1, comprising a plurality of pools of servers, and wherein each of the pools comprises one or more primary servers, and one or more backup servers.

5. The system of claim 1, wherein each of the origin servers in the first pool is associated with a configuration identifying that origin server as either a primary server or a backup server.

6. A method for use in a computing environment comprising:
   providing a traffic director having one or more traffic director instances, wherein the traffic director is configured to receive and communicate requests, from clients, to origin servers;
   providing a first pool of origin servers comprising one or more primary servers and one or more backup servers; and
   determining the availability of primary servers in the first pool using the traffic director;
   directing all requests for the first pool from the traffic director only to said one or more primary servers in the first pool while at least one of said one or more primary servers in the first pool is available; and
   if no primary server is available in the first pool, directing all requests received by the traffic director for the first pool from the traffic director to said one or more backup servers in the first pool until at least one of said primary servers in the first pool becomes available again.

7. The method of claim 6, further comprising:
   continuing to direct all requests received by the traffic director to said one or more backup servers in the pool for a configurable period of time after at least one of said primary servers becomes available again after no primary server was available.

8. The method of claim 6, further comprising:
   providing a second pool of origin servers comprising one or more primary servers and one or more backup servers; and
   determining the availability of primary servers in the second pool using the traffic director;
   directing all requests for the second pool from the traffic director only to said one or more primary servers in the second pool while at least one of said one or more primary servers in the second pool is available; and
   if no primary server is available in the second pool, directing all requests received by the traffic director for the second pool from the traffic director to said one or more backup servers in the second pool until at least one of said primary servers in the second pool becomes available again.

9. The method of claim 6, further comprising:
   providing a plurality of pools of servers, and wherein each of the pools comprises one or more primary servers, and one or more backup servers.

10. The method of claim 6, further comprising:
associating each origin servers in the first pool with a configuration identifying that server as either a primary server or a backup server.

11. A non-transitory computer readable medium, including instructions stored thereon which when read and executed by one or more computers cause the one or more computers to perform steps comprising:
providing a traffic director having one or more traffic director instances, wherein the traffic director is configured to receive and communicate requests, from clients, to origin servers;
providing a first pool of origin servers comprising one or more primary servers and one or more backup servers; and
determining the availability of primary servers in the first pool using the traffic director;
directing all requests for the first pool from the traffic director only to said one or more primary servers in the first pool while at least one of said one or more primary servers in the first pool is available; and
if no primary server is available in the first pool, directing all requests received by the traffic director for the first pool from the traffic director to said one or more backup servers in the first pool until at least one of said primary servers in the first pool becomes available again.

12. The non-transitory computer readable medium of claim 11, including further instructions stored thereon which when read and executed by one or more computers cause the one or more computers to perform further steps comprising:
continuing to direct all requests received by the traffic director to said one or more backup servers in the pool for a configurable period of time after at least one of said primary servers becomes available again after no primary server was available.

13. The non-transitory computer readable medium of claim 11, including further instructions stored thereon which when read and executed by one or more computers cause the one or more computers to perform further steps comprising:
providing a second pool of origin servers comprising one or more primary servers and one or more backup servers; and
determining the availability of primary servers in the second pool using the traffic director;
directing all requests for the second pool from the traffic director only to said one or more primary servers in the second pool while at least one of said one or more primary servers in the second pool is available; and
if no primary server is available in the second pool, directing all requests received by the traffic director for the second pool from the traffic director to said one or more backup servers in the second pool until at least one of said primary servers in the second pool becomes available again.

14. The non-transitory computer readable medium of claim 11, including further instructions stored thereon which when read and executed by one or more computers cause the one or more computers to perform further steps comprising:
providing a plurality of pools of servers, and wherein each of the pools comprises one or more primary servers, and one or more backup servers.

15. The non-transitory computer readable medium of claim 11, including further instructions stored thereon which when read and executed by one or more computers cause the one or more computers to perform further steps comprising:
associating each of the origin servers in the first pool with a configuration identifying that server as either a primary server or a backup server.

* * * * *

UNITED STATES PATENT AND TRADEMARK OFFICE
CERTIFICATE OF CORRECTION

PATENT NO. : 8,914,521 B2  
APPLICATION NO. : 13/601087  
DATED : December 16, 2014  
INVENTOR(S) : Leftik et al.

Page 1 of 1

It is certified that error appears in the above-identified patent and that said Letters Patent is hereby corrected as shown below:

In the Drawings

On sheet 3 of 7, in figure 3, under Reference Numeral 224, line 10, delete "Instrusion" and insert -- Intrusion --, therefor.

On sheet 7 of 7, in figure 3, under Reference Numeral 380, line 1, delete "Di rector" and insert -- Director --, therefor.

On sheet 7 of 7, in figure 3, under Reference Numeral 382, line 2, delete "C onfiguration" and insert -- Configuration --, therefor.

On sheet 7 of 7, in figure 3, under Reference Numeral 384, line 1, delete "onl y" and insert -- only --, therefor.

On sheet 7 of 7, in figure 3, under Reference Numeral 384, line 2, delete "availabl e" and insert -- available --, therefor.

On sheet 7 of 7, in figure 3, under Reference Numeral 386, line 2, delete "Server s" and insert -- Servers --, therefor.

In the Claims

In column 9, lines 44-45, in Claim 1, delete "as primary" and insert -- primary --, therefor.

In column 9, line 45, in Claim 1, delete "and or" and insert -- and one or --, therefor.

Signed and Sealed this  
Twenty-eighth Day of July, 2015

Michelle K. Lee  
*Director of the United States Patent and Trademark Office*